(12) United States Patent
Otsuka et al.

(10) Patent No.: US 8,278,555 B2
(45) Date of Patent: Oct. 2, 2012

(54) ELECTRIC WIRE CONDUCTOR AND A METHOD OF PRODUCING THE SAME

(75) Inventors: Yasuyuki Otsuka, Yokkaichi (JP); Yoshihiro Nakai, Osaka (JP); Taichirou Nishikawa, Osaka (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 509 days.

(21) Appl. No.: 12/312,033

(22) PCT Filed: Oct. 30, 2007

(86) PCT No.: PCT/JP2007/071142
§ 371 (c)(1),
(2), (4) Date: Jun. 8, 2009

(87) PCT Pub. No.: WO2008/053897
PCT Pub. Date: May 8, 2008

(65) Prior Publication Data
US 2010/0071933 A1    Mar. 25, 2010

(30) Foreign Application Priority Data

Oct. 30, 2006 (JP) .................... 2006-294130

(51) Int. Cl.
*H01B 5/00* (2006.01)
(52) U.S. Cl. .................................... 174/126.1
(58) Field of Classification Search .......... 174/36, 174/110 R, 120 R, 120 C, 120 AS, 120 SR
See application file for complete search history.

(56) References Cited

U.S. PATENT DOCUMENTS

| | | | | |
|---|---|---|---|---|
| 2,572,562 | A | * | 10/1951 | Harrington .................... 310/179 |
| 3,586,751 | A | * | 6/1971 | Schoerner ..................... 174/115 |
| 3,826,690 | A | * | 7/1974 | Bleinberger et al. ......... 148/526 |
| 3,952,571 | A | * | 4/1976 | Yokota et al. .................... 72/286 |
| 4,574,604 | A | * | 3/1986 | Vogel et al. ........................ 72/38 |
| 4,604,860 | A | * | 8/1986 | Matsuura et al. .................... 57/9 |
| 5,149,917 | A |   | 9/1992 | Sawada et al. |
| 5,753,380 | A | * | 5/1998 | Takahashi et al. ............. 428/651 |
| 2002/0162607 | A1 | * | 11/2002 | Chadwick et al. ............ 148/415 |
| 2008/0196923 | A1 | * | 8/2008 | Susai et al. ................ 174/110 R |

FOREIGN PATENT DOCUMENTS

| | | |
|---|---|---|
| JP | A-56-065968 | 6/1981 |
| JP | A-63-243252 | 10/1988 |
| JP | A-05-266719 | 10/1993 |
| JP | A-06-060722 | 3/1994 |
| JP | 2004-134212 * | 4/2004 |
| JP | A-2004-134212 | 4/2004 |
| JP | A-2005-336549 | 12/2005 |

OTHER PUBLICATIONS

Jun. 19, 2012 Office Action issued in Japanese Patent Application No. 2006-294130 (with translation).

* cited by examiner

*Primary Examiner* — William Mayo, III
(74) *Attorney, Agent, or Firm* — Oliff & Berridge, PLC

(57) ABSTRACT

A conductor includes elemental wires made from an aluminum alloy containing Si whose content is 0.3-1.2 mass %, Mg whose content makes an Mg/Si weight ratio in a range from 0.8 to 1.8, and a remainder essentially including Al and an unavoidable impurity. The conductor has tensile strength of 240 MPa or more, breaking elongation of 10% or more, impact absorption energy of 8 J/m or more, and electrical conductivity of 40% IACS or more. The production method includes the step of preparing a strand by bunching elemental wires with the above composition, and the step of subjecting the wire to solution treatment, quenching, and aging heat treatment. Solution treatment temperature is 500-580° C., and aging heat treatment temperature is 150-220° C. Heating in solution treatment is high frequency induction heating.

9 Claims, No Drawings

US 8,278,555 B2

ELECTRIC WIRE CONDUCTOR AND A METHOD OF PRODUCING THE SAME

TECHNICAL FIELD

The present invention relates to a conductor of an electric wire and a method of producing the same, and more specifically relates to a conductor suitably used for an automotive electric wire and a method of producing the same.

BACKGROUND ART

In the field of electric power industry providing overhead power lines, an aluminum conductor made from an aluminum-based material is conventionally used because the aluminum conductor is light in weight and excellent in electrical conductivity. In the fields of automobiles, OA equipment, and home electric appliances, a copper conductor made from a copper-based material excellent in electrical conductivity is used for signal lines and electric power lines.

In the field of automobiles, the performance and function of a car have been rapidly improved. Therefore, the number of electric devices, control devices, and other devices to be installed in the car is increasing, and accordingly the number of copper conductors to be used in the car is also increasing.

Recently, attention is focused, especially in the field of automobiles, on an aluminum conductor in which aluminum whose specific gravity is about one third of copper is used for a conductor for the purpose of weight reduction (for information, the density of aluminum is 2.70 g/cm$^3$ and the density of copper is 8.89 g/cm$^3$).

Although a pure aluminum (purity of 99% or more) is used for a conductor having a cross-sectional area of 10 mm$^2$ or more such as a battery cable in the field of automobiles, the pure aluminum is low in strength and inferior in fatigue resistance, and is accordingly difficult to use for an ordinary conductor having a cross-sectional area of 1.5 mm$^2$ or less.

Hence, attempts have been made to improve strength and fatigue resistance of such an aluminum conductor. For example, an automotive electric wire is made from an Al—Mg—Si alloy (see Japanese Patent Application Unexamined Publication No. 2004-134212).

This conductor is prepared by bunching a plurality of aluminum alloy wires which contain 0.6 wt % or less Fe, 0.2 to 1.0 wt % Si, 0.2 to 1.0 wt % Mg, and a remainder including aluminum and an unavoidable impurity, and strength of the aluminum alloy is improved by precipitating Mg$_2$Si and other elements in an Al matrix by heat treatment in the process of producing the conductor.

DISCLOSURE OF THE INVENTION

Problem to be Solved by the Invention

However, in the electric wire disclosed in Japanese Patent Application Unexamined Publication No. 2004-134212, although the aluminum alloy conductor is being hardened and therefore the strength is improved, elongation is low and fatigue resistance in a high strain state and impact resistance are inferior. Therefore, there is a problem that the conductor is difficult to use for a small-diameter conductor having a cross-sectional area of 0.75 mm$^2$ or less, for example.

An object of the present invention is to overcome the problems described above and to provide a conductor excellent in tensile strength, breaking elongation, impact resistance, electrical conductivity, and fatigue resistance, and a method of producing the same.

Means for Solving Problem

To achieve the objects and in accordance with the purpose of the present invention, a conductor includes a plurality of elemental wires made from an aluminum alloy, the aluminum alloy containing Si whose content is 0.3 to 1.2 mass %, Mg whose content makes an Mg/Si weight ratio in a range from 0.8 to 1.8, and a remainder essentially including Al and an unavoidable impurity, wherein the conductor has tensile strength of 240 MPa or more, breaking elongation of 10% or more, impact absorption energy of 8 J/m or more, and electrical conductivity of 40% IACS or more.

The aluminum alloy may further contain one or more elements selected from the group consisting of Fe, Cu, Cr, and Mn, where a total content of the one or more elements is 0.5 mass % or less.

The aluminum alloy may further contain one or two elements selected from the group consisting of no more than 500 ppm Ti and no more than 50 ppm B.

The conductor is suitable for an electric wire whose conductor has a cross-sectional area of 0.75 mm$^2$ or less.

A method of producing a conductor according to the present invention includes the step of preparing a strand by bunching a plurality of elemental wires made from an aluminum alloy containing Si whose content is 0.3 to 1.2 mass %, Mg whose content makes an Mg/Si weight ratio in a range from 0.8 to 1.8, and a remainder essentially including Al and an unavoidable impurity, and the step of subjecting the strand to solution treatment, then subjecting the strand to quenching, and then subjecting the strand to aging heat treatment.

A heating temperature when subjecting the strand to the solution treatment is preferably 500 to 580° C., and a heating temperature when subjecting the strand to the aging heat treatment is preferably 150 to 220° C.

Heating during the solution treatment is preferably high frequency induction heating.

Effect of the Invention

Because the conductor according to the present invention is made up of the elemental wires which are made from the Al—Mg—Si alloy with the above-specified ranges and has the tensile strength of 240 MPa or more, the breaking elongation of 10% or more, the impact absorption energy of 8 J/m or more, and the electrical conductivity of 40% IACS or more, it is excellent in tensile strength, breaking elongation, impact resistance, electrical conductivity, and fatigue resistance, and can be used for a small-diameter electric wire.

If the aluminum alloy further contains the one or more elements selected from the group consisting of Fe, Cu, Cr, and Mn, where the total content of the one or more elements is 0.5 mass % or less, the strength of the conductor is further improved.

If the aluminum alloy further contains the one or two elements selected from the group consisting of no more than 500 ppm Ti and no more than 50 ppm B, the strength and elongation of the conductor are further improved. These advantages are assumed to be obtained because these elements have an advantage of finer crystalline structure.

Because the conductor may be used for an electric wire whose conductor has a cross-sectional area of 0.75 mm$^2$ or less, the range of application of aluminum conductors can be broadened, and weight reduction of electric wires in the field of automobiles can be achieved.

In the method of producing the conductor according to the present invention, the solution treatment after preparing the strand by bunching the aluminum alloy elemental wires improves impact absorption energy owing to recovery of elongation. In addition, the subsequent aging heat treatment provides an advantage of improved strength owing to improved precipitation and an advantage of improved electrical conductivity owing to reduced amounts of dissolved elements. Accordingly, the conductor according to the present invention is excellent in tensile strength, breaking elongation, impact resistance, electrical conductivity, and fatigue resistance.

If the heating temperature when subjecting the strand to the solution treatment is 500 to 580° C. and the heating temperature when subjecting the strand to the aging heat treatment is 150 to 220° C., the solution treatment and the aging heat treatment can be properly performed.

The solution treatment by the high frequency induction heating allows local heating to be performed, and accordingly the quenching area can be placed immediately next to the heating area. Thus, the quenching can be performed immediately after the solution treatment not only on a structural member with larger thermal capacity but also on a structural member with smaller thermal capacity such as a wire in which slow cooling starts immediately after heating is stopped. In addition, the product ion method according to the present invention, which allows for the continuous heating and quenching, is suitable for a long structural member such as a wire.

BEST MODE FOR CARRYING OUT THE INVENTION

A detailed description of the present invention will now be provided.

A conductor according to the present invention is prepared by stranding a plurality of elemental wires made from an aluminum alloy containing Si, Mg, and a remainder essentially including Al and an unavoidable impurity. The conductor has tensile strength of 240 MPa or more, breaking elongation of 10% or more, impact absorption energy of 8 J/m or more, and electrical conductivity of 40% IACS or more.

A description of the reason why the composition of the alloy is specified as described above is provided. In the following description, the content of each constituent element is expressed in the unit mass %.

Si is combined with Mg to finely precipitate $Mg_2Si$ particles and other particles in an Al matrix, and contributes to improved strength of the aluminum alloy. In order to obtain the advantage of improved strength, a content of Si is preferably 0.3 to 1.2%. If the Si content is less than 0.3%, the advantage of improved strength is small, and it is difficult for the conductor to have the tensile strength of 240 MPa or more. On the other hand, if the Si content is more than 1.2%, it is difficult for the conductor to have the electrical conductivity of 40% IACS or more.

Mg is combined with Si to finely precipitate the $Mg_2Si$ particles and other particles in the Al matrix, and contributes to improved strength of the aluminum alloy elemental wires. In order to obtain the advantage of improved strength, an Mg/Si weight ratio is preferably in a range from 0.8 to 1.8, more preferably in a range from 1.0 to 1.4. If the Mg/Si weight ratio is less than 0.8, an amount of the $Mg_2Si$ compound is small, the advantage of improved strength is small, and accordingly it is difficult for the conductor to have the tensile strength of 240 MPa or more. In addition, excess Si changes into crystallized substances, and due to the influence of the crystallized substances, it is difficult for the conductor to have the breaking elongation of 10% or more and the impact absorption energy of 8 J/m or more. On the other hand, if the Mg/Si weight ratio is more than 1.8, a solution amount of excess Mg becomes large, and it is difficult for the conductor to have the electrical conductivity of 40% IACS or more.

The aluminum alloy constituting the conductor according to the present invention may contain one or more additive elements selected from the group consisting of Fe, Cu, Cr, and Mn in addition to the above-described constituent elements. These additive elements contribute to improved strength of the aluminum alloy. In order to obtain the advantage of improved strength, a total content of the additive elements is preferably 0.5% or less. In addition, the number of additive elements is preferably two or less. A larger content of the additive elements could easily lower breaking elongation and impact absorption energy and easily increase conductor resistance.

The conductor according to the present invention may contain one or two additive elements selected from the group consisting of Ti and B in addition to the above-described constituent elements. These additive elements have an advantage of finer crystalline structure and contribute to improved strength and improved elongation of the aluminum alloy. In order to obtain the advantage of finer crystalline structure, Ti is preferably no more than 500 ppm, and B is preferably no more than 50 ppm. Larger contents of these additive elements could easily increase conductor resistance.

The conductor according to the present invention is suitable for a small-diameter electric wire because it is excellent in tensile strength, breaking elongation, impact resistance, electrical conductivity, and fatigue resistance. The conductor according to the present invention is suitably used for an electric wire whose conductor has a cross-sectional area of preferably 0.75 $mm^2$ or less, and more preferably 0.22 to 0.75 $mm^2$. Thus, the range of application of aluminum conductors is broadened, and weight reduction of electric wires preferably in the field of automobiles can be achieved. It should be noted that the conductor may be a compressed conductor.

Next, a description of an example of a method of producing the conductor according to the present invention is provided. A method of producing a conductor according to one preferred embodiment of the present invention includes the step of preparing a strand by bunching a plurality of elemental wires made from an aluminum alloy with the alloy composition described above, and the step of subjecting the strand to solution treatment, then subjecting the strand to quenching, and then subjecting the strand to aging heat treatment.

In making the aluminum alloy elemental wires, given contents of Al, Mg, and Si are molten in order to obtain a molten metal of a desired concentration. Fe, Cu, Cr, and Mn are added thereto as necessary in order to obtain a molten metal of a desired concentration.

Next, the molten metal is casted by a continuous casting machine to prepare a cast bar. Then, the cast bar is made into a wire rod by using a hot rolling mill connected to a tandem. The wire rod may be made by the continuous casting rolling method as described above or by the billet casting and extrusion method. In the case of the billet casting and extrusion method, homogenization is preferably performed after billet casting. It is advantageous to add Ti and B which define refining agents immediately before casting.

The wire rod is then subjected to drawing so as to have a desired diameter for an elemental wire. If the wire rod is broken due to drawing limit, annealing is preferably performed as appropriate.

A desired number of elemental wires prepared as described above are bunched to be a strand in the bunching process. Then, the strand undergoes the heat treatment process.

In the heat treatment process, a heating temperature during the solution treatment is preferably 500 to 580° C. By performing the solution treatment, the $Mg_2Si$ compound in the aluminum alloy is dissolved. If the heating temperature during the solution treatment is lower than 500° C., the $Mg_2Si$ compound is hardly dissolved to generate coarse compound particles, and the advantage of improved strength cannot be easily obtained. In addition, work hardening caused by cold working before the bunching process is hard to remove, and the advantage of improved elongation cannot be easily obtained. On the other hand, if the heating temperature during the solution treatment is higher than 580° C., low melting phases in the aluminum alloy are molten again, and deformation and color change caused by oxidation of Mg easily occur.

In the heat treatment step, the quenching is preferably performed by using coolant water. By performing the quenching, the $Mg_2Si$ compound which has been dissolved in the alloy during the solution treatment is not precipitated and is fixed in the alloy in a dissolved state. If there is a time interval between the heating and the quenching, the dissolved $Mg_2Si$ compound is easily precipitated to generate coarse compound particles, and the advantage of improved strength cannot be easily obtained. Therefore, the quenching is preferably performed immediately after the heating.

The solution treatment and the quenching are preferably performed by using a continuous annealing machine with a quenching bath in such a manner that the strand is heated to a given temperature by a heating portion and is then cooled by being passed through the quenching bath which is placed next to the heating portion. Examples of the continuous annealing machine include an electric continuous annealing machine, a tubular furnace continuous annealing machine, and a high-frequency induction heating continuous annealing machine. Among them, the high-frequency induction heating continuous annealing machine is especially preferable. In the case of using the high-frequency induction heating continuous annealing machine, the solution treatment is performed by high-frequency induction heating, and accordingly local heating is allowed. Thus, the quenching area can be placed immediately next to the heating area.

In a structural member with larger thermal capacity, for example, a high-temperature state can be maintained after heating is stopped. In contrast, in a structural member with smaller thermal capacity such as a wire, slow cooling starts immediately after heating is stopped. However, the placement of the quenching area immediately next to the heating area as described above allows quenching from a high-temperature state to be performed even on the structural member with smaller thermal capacity such as a wire in which slow cooling easily starts immediately after heating is stopped.

In addition, the placement of the quenching area immediately next to the heating area allows the heating and the quenching to be performed continuously, and is especially suitable for a long structural member such as a wire. The continuous heating and quenching improve productivity of the conductor.

In the heat treatment step, the aging heat treatment can precipitate the $Mg_2Si$ compound which has been dissolved in the alloy during the solution treatment and the quenching. Thus, strength and electrical conductivity can be improved. A heating temperature during the aging heat treatment is preferably 150 to 220° C. Duration of the aging heat treatment is preferably 4 to 20 hours.

If the heating temperature during the aging heat treatment is lower than 150° C., the $Mg_2Si$ compound which has been dissolved in the alloy is hard to precipitate, and the advantage of improved strength cannot be easily obtained. On the other hand, if the heating temperature during the aging heat treatment is higher than 220° C., the precipitated $Mg_2Si$ compound easily grows into coarse particles, and the advantage of improved strength cannot be easily obtained. In addition, if the duration of the aging heat treatment is shorter than 4 hours, the $Mg_2Si$ compound is incompletely precipitated, and the advantage of improved strength cannot be easily obtained, and conductor resistance easily increases. On the other hand, if the duration of the aging heat treatment is longer than 20 hours, the precipitated $Mg_2Si$ compound easily grows into coarse particles, and the advantage of improved strength cannot be easily obtained.

The aging heat treatment is preferably performed with the conductor being wound around a reel. Although the aging heat treatment may be performed in normal atmosphere, the aging heat treatment is preferably performed in reductive gas atmosphere or in inert gas atmosphere in order to avoid surface oxidation.

Owing to the production method as described above, the performance of the conductor according to the present invention can be obtained. The thus-obtained conductor covered with an insulator defines an insulated wire.

EXAMPLE

A detailed description of the present invention is provided hereinafter by referring to Examples.

Examples 1 to 4

Molten alloys of alloy composition shown in Table 1 were casted by a continuous casting machine to prepare cast bars. Then, each of the cast bars was made into a wire rod of 9.5 mm in diameter by a hot rolling mill, and each of the obtained wire rods was subjected to drawing to prepare an elemental wire of 0.26 mm in diameter. Then, seven elemental wires were bunched to prepare each strand. Subsequently, the strands were subjected to solution treatment, quenching, and aging heat treatment under conditions shown in Table 1. As a result, conductors according to Examples 1 to 4 were obtained.

Comparative Examples 1 to 8

Conductors according to Comparative Examples 1 to 8 were obtained with alloy composition and conditions shown in Table 1 in the same manner as Examples 1 to 4.

Comparative Examples 9 and 10

Conductors according to Comparative Examples 9 and 10 were obtained in the same manner as Examples 1 to 4 except for not performing solution treatment, quenching, and aging heat treatment after preparing each strand by bunching elemental wires.

(Evaluation Test)

Each conductor was measured for tensile strength, breaking elongation, impact absorption energy, electrical conductivity, and fatigue resistance at a given strain amplitude ($\Delta\epsilon$). In addition, the surface appearance of each conductor was measured. Results thereof are shown in Table 1. The content of each constituent element in the alloy composition is expressed in the unit mass % with respect to the whole aluminum alloy.

(Measurement Method and Evaluation Method)

Tensile Strength

Tensile strength was measured by a common tensile strength tester. Tensile strength of 240 MPa or more was regarded as passed.

Breaking Elongation

Breaking elongation was measured by a common tensile strength tester. Breaking elongation of 10% or more was regarded as passed.

Impact Absorption Energy

Impact absorption energy was measured by attaching a weight to the end of each conductor having a distance between marks of 1 meter, and lifting by 1 meter and then dropping the weight freely. It is defined that when the maximum weight of the weight with which the conductor is not broken is W(N), the impact absorption energy is W(J/m). Impact absorption energy before break of 8 J/m or more was regarded as passed.

Electrical Conductivity

Electrical conductivity was measured by the bridge method. Electrical conductivity of 40% IACS (International Annealed Copper Standard) or more was regarded as passed.

Fatigue Resistance

Fatigue resistance of an electric wire which was prepared by covering each conductor with an insulator was measured by a reverse bend fatigue tester which does not impose tensile load. Fatigue resistance of 900 times or more at a strain amplitude $\Delta\epsilon$ of $10^{-2}$ and fatigue resistance of 10 multiplied by $10^4$ times or more at a strain amplitude $\Delta\epsilon$ of $10^{-4}$ were regarded as passed.

Surface Appearance

Presence of color change and deformation was visually checked. Absence of color change and deformation is indicated by "○", and presence of color change and deformation is indicated by "x".

the conductors each had the tensile strength of 240 MPa or more, the breaking elongation of 10% or more, the impact absorption energy of 8 J/m or more, and the electrical conductivity of 40% IACS or more. In addition, the conductors each had the fatigue resistance of 900 times or more at the high strain amplitude. In addition, color change and deformation were not detected on the surfaces of the conductors. Accordingly, it was shown that the conductors in Examples 1 to 4 are excellent in tensile strength, breaking elongation, impact resistance, electrical conductivity, and fatigue resistance.

In contract, in the conductors according to Comparative Examples 1 to 4, because the Si content and the Mg content of each of the aluminum alloys were not in the above-specified ranges, not all of the tensile strength, the breaking elongation, the impact absorption energy, the electrical conductivity, and the fatigue resistance at the high strain amplitude satisfied the above-specified ranges. Accordingly, it was shown that the conductors according to Comparative Examples 1 to 4 are inferior in tensile strength, breaking elongation, impact resistance, electrical conductivity, and fatigue resistance.

TABLE 1

| | | Alloy Composition (mass %) | | | | Solution treatment | Aging heat treatment | |
|---|---|---|---|---|---|---|---|---|
| | | Si | Mg | Additive elements | Al | Mg/Si | temperature °C. | Temp. °C. | Duration Hr |
| Example | 1 | 0.5 | 0.7 | | remainder | 1.4 | 560 | 180 | 8 |
| | 2 | 1.2 | 1.0 | | remainder | 0.8 | 560 | 180 | 20 |
| | 3 | 0.3 | 0.5 | Fe0.1, Ti0.02 | remainder | 1.7 | 550 | 170 | 12 |
| | 4 | 0.6 | 0.6 | Fe0.3, Mn0.1, Cr0.08, Ti0.03, B0.002 | remainder | 1.0 | 570 | 160 | 20 |
| Comp. Example | 1 | 0.2 | 0.2 | | remainder | 1.0 | 560 | 180 | 20 |
| | 2 | 1.3 | 1.3 | | remainder | 1.0 | 560 | 180 | 20 |
| | 3 | 1.2 | 0.3 | | remainder | 0.3 | 560 | 180 | 20 |
| | 4 | 0.4 | 1.0 | | remainder | 2.5 | 560 | 180 | 20 |
| | 5 | 0.5 | 0.7 | | remainder | 1.4 | 480 | 180 | 8 |
| | 6 | 0.5 | 0.7 | | remainder | 1.4 | 600 | 180 | 8 |
| | 7 | 0.5 | 0.7 | | remainder | 1.4 | 560 | 140 | 3 |
| | 8 | 0.5 | 0.7 | | remainder | 1.4 | 560 | 250 | 25 |
| | 9 | 0.9 | 0.9 | Fe0.4, Mn0.02, Cu0.1 | remainder | 1.0 | | | |
| | 10 | 0.3 | 0.3 | Fe0.1, Mn0.01, Cu0.02 | remainder | 1.0 | | | |

| | | Tensile strength MPa | Breaking elongation % | Electrical conductivity % IACS | Impact absorption energy J/m | Fatigue resistence $\Delta\epsilon = 10^{-2}$ Times | $\Delta\epsilon = 10^{-4}$ Times (×$10^4$) |
|---|---|---|---|---|---|---|---|
| Example | 1 | 285 | 16 | 56 | 12 | 1172 | 11 |
| | 2 | 310 | 12 | 48 | 10 | 992 | 12 |
| | 3 | 265 | 17 | 58 | 13 | 1217 | 11 |
| | 4 | 325 | 11 | 42 | 9 | 947 | 13 |
| Comp. Example | 1 | 210 | 21 | 58 | 10 | 1397 | 8.4 |
| | 2 | 325 | 12 | 32 | 13 | 992 | 13 |
| | 3 | 220 | 16 | 48 | 10 | 1172 | 8.8 |
| | 4 | 280 | 9 | 38 | 5 | 857 | 11 |
| | 5 | 300 | 5 | 54 | 2 | 677 | 12 |
| | 6 | 200 | 8 | 56 | 5 | 812 | 8 |
| | 7 | 220 | 18 | 46 | 10 | 1262 | 8.8 |
| | 8 | 200 | 21 | 56 | 13 | 1397 | 8 |
| | 9 | 320 | 1.2 | 56 | 2 | 506 | 13 |
| | 10 | 250 | 1.5 | 57 | 2 | 520 | 10 |

Referring to Table 1, because the aluminum alloys constituting the conductors according to Examples 1 to 4 each contain Si whose content is 0.3 to 1.2% and Mg whose content makes an Mg/Si weight ratio in a range from 0.8 to 1.8, To be more specific, when the Si content was less than 0.3% (Comparative Example 1), the tensile strength was less than 240 MPa, and when the Si content was more than 1.2% (Comparative Example 2), the electrical conductivity was less than 40% IACS. In addition, when the Mg/Si weight ratio was less than 0.8 (Comparative Example 3), the tensile strength was less than 240 MPa. When the Mg/Si weight ratio was more than 1.8 (Comparative Example 4), the breaking elongation was less than 10%, the impact absorption energy was less than 8 J/m, and the electrical conductivity was less than 40% IACS.

In the conductors according to Comparative Examples 5 to 8, because the solution treatment with the heating temperature of 500 to 580° C. and the aging heat treatment with the heating temperature of 150 to 220° C. and the duration of 4 to 20 hours were not performed, not all of the tensile strength, the breaking elongation, the impact absorption energy, the electrical conductivity, and the fatigue resistance at the high strain amplitude satisfied the above-specified ranges. Accordingly, it was shown that the conductors in Comparative Examples 5 to 8 are inferior in tensile strength, breaking elongation, impact resistance, and fatigue resistance.

To be more specific, when the heating temperature during the solution treatment was lower than 500° C. (Comparative Example 5), the breaking elongation was less than 10%, and the impact absorption energy was less than 8 J/m. When the heating temperature during the solution treatment was higher than 580° C. (Comparative Example 6), the tensile strength was less than 240 MPa, the breaking elongation was less than 10%, and the impact absorption energy was less than 8 J/m. Additionally, color change and deformation were detected on the surface of the conductor. When the heating temperature during the aging heat treatment was lower than 150° C. and the duration of aging heat treatment was shorter than 4 hours (Comparative Example 7), the tensile strength was less than 240 MPa. When the heating temperature during the aging heat treatment was higher than 220° C. and the duration of the aging heat treatment was longer than 20 hours (Comparative Example 8), the tensile strength was less than 240 MPa.

In the conductors according to Comparative Examples 9 and 10, solution treatment, quenching, and aging heat treatment were not performed after preparing the strands by bunching the elemental wires as in the case of conventional aluminum conductors. Thus, work hardening caused by cold working before the bunching step was hard to remove enough, and elongation was low. As a result, the breaking elongation was less than 10%, and the impact absorption energy was less than 8 J/m. Accordingly, it was found that the conductors according to Comparative Examples 9 and 10 are inferior in breaking elongation and impact resistance.

The foregoing description of the preferred embodiment of the present invention is not intended to be exhaustive or to limit the invention to the precise form disclosed, and modifications and variations are possible in the light of the above teachings or may be acquired from practice of the invention.

For example, the conductors in the above-described Example are each arranged such that seven elemental wires are stranded; however, the present invention is not limited thereto.

INDUSTRIAL APPLICABILITY

The conductor according to the present invention is suitably used for an automotive electric wire, for example.

The invention claimed is:

1. A conductor comprising a plurality of elemental wires made from an aluminum alloy, the aluminum alloy containing:

Si whose content is 0.3 to 1.2 mass %;

Mg whose content makes an Mg/Si weight ratio in a range from 0.8 to 1.8; and a remainder essentially including Al and an unavoidable impurity, wherein the conductor has tensile strength of 240 MPa or more, breaking elongation of 10% or more, impact absorption energy of 8 J/m or more, and electrical conductivity of 40% IACS or more, wherein, the aluminum alloy further contains one or two elements selected from the group consisting of no more than 500 ppm Ti and no more than 50 ppm B.

2. The conductor according to claim 1, wherein the aluminum alloy further contains one or more elements selected from the group consisting of Fe, Cu, Cr, and Mn, where a total content of the one or more elements is 0.5 mass % or less.

3. The conductor according to claim 1, wherein the conductor has a cross-sectional area of 0.75 mm$^2$ or less.

4. A method of producing a conductor, the method comprising the steps of:

preparing a strand by bunching a plurality of elemental wires made from an aluminum alloy containing Si whose content is 0.3 to 1.2 mass %, Mg whose content makes an Mg/Si weight ratio in a range from 0.8 to 1.8, and a remainder essentially including Al and an unavoidable impurity; and subjecting the strand to solution treatment, then subjecting the strand to quenching, and then subjecting the strand to aging heat treatment, wherein the aluminum alloy further contains one or two elements selected from the group consisting of no more than 500 ppm Ti and no more than 50 ppm B.

5. The method according to claim 4, wherein a heating temperature when subjecting the strand to the solution treatment is 500 to 580° C., and a heating temperature when subjecting the strand to the aging heat treatment is 150 to 220° C.

6. The method according to claim 4, wherein heating during the solution treatment is high frequency induction heating.

7. The conductor according to claim 2, wherein the conductor has a cross-sectional area of 0.75 mm$^2$ or less.

8. The conductor according to claim 1, wherein the conductor has a cross-sectional area of 0.75 mm$^2$ or less.

9. The method according to claim 5, wherein heating during the solution treatment is high frequency induction heating.

* * * * *